(12) United States Patent
Carle et al.

(10) Patent No.: US 7,593,784 B2
(45) Date of Patent: Sep. 22, 2009

(54) MACHINERY CONDITION ASSESSMENT MODULE

(75) Inventors: Patrick F. Carle, Austin, TX (US); Thomas Alford, Milford, OH (US); David Bibelhausen, Maineville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 156 days.

(21) Appl. No.: 11/537,312

(22) Filed: Sep. 29, 2006

(65) Prior Publication Data

US 2007/0073521 A1 Mar. 29, 2007

Related U.S. Application Data

(63) Continuation-in-part of application No. 11/146,853, filed on Jun. 7, 2005.

(51) Int. Cl.
    *G06F 19/00* (2006.01)
(52) U.S. Cl. ...................................... 700/175
(58) Field of Classification Search ................. 700/108, 700/110, 111, 175, 280
    See application file for complete search history.

(56) References Cited

U.S. PATENT DOCUMENTS

| | | | |
|---|---|---|---|
| 6,330,525 B1 * | 12/2001 | Hays et al. | 702/183 |
| 6,484,109 B1 * | 11/2002 | Lofall | 702/56 |
| 7,024,335 B1 * | 4/2006 | Parlos | 702/182 |
| 2006/0089743 A1 * | 4/2006 | Jalluri et al. | 700/174 |
| 2007/0073521 A1 | 3/2007 | Carle et al. | |

OTHER PUBLICATIONS

Hadden et al.;"Shipboard Machinery Diagnostics and Prognostics/Condition Based Maintenance: A Progress Report"; 2000; IEEE; pp. 277-292.*
Nguyen et al. "A System Approach to Machinery Condtion Monitoring and Diagnostic"; Nov. 7,2001; pp. 1-12.*
Holroyd,Trevor J.; "Machine Condition and Dynamic Diagnostics Via Acoustic Emission"; 1999; The Institution of Electrical Engineers; pp. 5/1-5/4.*
Dyke, Joe Van; "Using an Expert System for Processing Machine Tool Diangnostics: A Case Study"; Oct. 20, 2002; DLI Engineering; pp. 1-10.*
"ExpertALERT Machine Condtion Assessment Software"; Oct. 18, 2003; DLI Engineering; pp. 1-2.*

* cited by examiner

*Primary Examiner*—Albert DeCady
*Assistant Examiner*—Chad Rapp
(74) *Attorney, Agent, or Firm*—Boyle Fredrickson LLP; R. Scott Speroff

(57) ABSTRACT

A machine condition assessment module may be integrated with standard industrial control and communications networks to receive dynamic operating data from signal processing engines and optionally process data from controlled machinery and to operate on that data according to standard and user customized rule sets to produce an assessment of the presence and severity of specific electrical and/or mechanical faults. The output of the assessment module will be, for each of the one or more machines monitored, and for each of the one or more faults assessed, a single parameter that indicates the presence and severity of the fault. This data, in turn, may be readily communicated to an industrial controller on the network for use in effecting the control process itself.

18 Claims, 8 Drawing Sheets

MACHINERY CONDITION ASSESSMENT MODULE

CROSS-REFERENCE TO RELATED APPLICATIONS

This application is a continuation-in-part of U.S. application Ser. No. 11/146,853, filed Jun. 7, 2005.

BACKGROUND OF THE INVENTION

The present invention relates generally to monitoring systems for machinery. More particularly, the invention relates to a monitoring system that is readily integrated into a standard industrial control architecture.

Industrial controllers are special purpose computers that are used for the control of industrial processes or manufacturing equipment. Under the direction of a stored program, the industrial controller examines a series of inputs representing the state of the controlled process and changes outputs effecting the control of the process. The inputs and outputs may be binary, for example, on or off, or alternately, analog inputs and outputs taking on a continuous range of values. The inputs are typically from sensors including limit switches and the like, and the outputs may be provided to actuators, motors, and the like.

Normally, the components of an industrial process are spatially distributed about the factory or manufacturing facility. The industrial controller may communicate with these components via one or more remote I/O modules connected to the industrial controller through a specially designed control network such as ControlNet, DeviceNet or Ethernet/IP whose specifications are published and whose protocols are used broadly by a number of manufacturers and suppliers. These communication networks are characterized by being highly reliable and delivering data with a minimal and well-characterized delay as required for real-time control and may be implimented on dedicated network media, backplanes of devices, and/or wirelessly.

The machines of an industrial process may be monitored with monitoring equipment to assess the health of the machinery on a real-time basis and to predict and possibly avoid expensive failure. Such monitoring systems typically use high data-rate sensors, such as accelerometers and the like that may be, for example, attached to a bearing or journal to provide vibration data that may reflect impending equipment failure.

These sensors normally are wired to a signal processing engine that continually measures the signal and processes out key information from it. These signal processing engines are often linked to common computers, usually by standard Ethernet interfaces, that execute specialized software that can further process the data and provide a report to a user. Depending on the sophistication of the software system, the report will either provide the data necessary for an expert to evaluate the machines health, and/or it will, after applying a set of rules, provide its own evaluation of the machines condition. Vibration data, for example, may be analyzed for specific frequency components which might indicate wear of bearings used in high-speed machines or shaft misalignment. These computer systems and, more specifically, the sophisticated software required can be very expensive and requires a continuing investment in time-consuming operation by experts. Further, such systems are not typically real time systems. Most require data be uploaded from the protection monitors are defined schedules and the data or reports evaluated by experts sometime later. Few systems are integrated with operations such that data is evaluated and meaningful results immediately provided to the machine's operators immediately when changes are detected.

The problems associated with installing a monitoring system have been significantly reduced by the development of a set of "modular" signal processing engines, (also called monitoring modules) described in U.S. Pat. Nos. 6,662,118; 6,768,949; and 6,912,484, all incorporated by reference, that connect directly to the networks normally used in industrial control systems. Such connection allows monitoring to use the same communications infrastructure already present in many industrial control environments and further allows data to be communicated directly with a programmable logic controller, so that corrective action may be automatically initiated.

Each signal processing engine provides interface circuitry for the control network and for the type of sensors used in protection or monitoring applications, for example, accelerometers and high-speed displacement transducers. Importantly, the signal processing engines provide for pre-processing of the sensor data, for example, performing Fourier transform of accelerometer data and analyzing the spectrum against pre-defined bandwidths and amplitude or power thresholds. In this way, the high data-rate vibration data, for example, need not be communicated directly over the control network but rather only low data-rate "dynamic condition data" need be communicated. For example, vibration data is not transmitted but only dynamic condition data indicating that a particular frequency threshold has been exceeded. This prevents degradation of the control network's function of providing real-time control.

To provide flexibility, the signal processing engines normally have alterable configuration data, for example, defining particular frequency limits or bands describing the pre-processing to be performed by the signal processing engines.

While such signal processing engines are a considerable advance in simplifying and integrating machine monitoring into an industrial control system, they still require considerable expertise for configuring the signal processing engines and programming the industrial controller to interpret the operating assessments, particularly for installations where multiple signal processing engines are required. For example, some forms of failure detection may require monitoring of axial and radial acceleration at different points in the operation of the machine in different frequency bands depending on the particular control task being executed at that time. Determining the necessary modules and sensors and how they should be integrated together may still be challenging.

SUMMARY OF THE INVENTION

The present invention provides a "machine condition assessment module" that may attach to a control network and is intended to receive dynamic condition data from signal processing engines. The machine condition assessment module provides for a higher-level integration of data from the signal processing engines by executing combinatorial logic to assemble that data into as little as one output indicating the presence and severity of a mechanical or electrical fault or faults in one or more the monitored machines. This output or outputs may, in turn, be communicated over the control network to an industrial controller to be integrated into the control process.

In a preferred embodiment, the machine condition assessment module provides a pre-programmed template that guides the user into connecting the machine condition assessment module to necessary signal processing engines to access requisite processed data and to provide a near turn-key solution to particular machine condition assessment problems, i.e., detecting the presence and severity of specific mechanical and/or electrical faults.

A template is a rule set that specifies specific inputs such as levels of vibration, load, temperature, etc. and comparative logic that evaluates to determine the presence of a specific mechanical or electrical fault. The rule sets may be standard sets provided by the vendor or may be customized rules implemented by the end user. The MCAM will include further logic necessary to evaluate the severity of faults.

Specifically then, the present invention provides a machine condition assessment module having a processor and at least one network interface connecting the processor to a standard control network. A memory communicating with the processor holds at least one stored template program and an operating program executing to identify at least one network address of a signal processing engine of an identified type on the industrial network and to identify at least one network address for an output alarm signal. The operating program executes combinatorial logic associated with the template accepting as arguments dynamic operating condition data from the modules to produce the output signal that is transmitted on the network.

Thus, it is one object of at least one embodiment of the invention to provide for simplified implementation of a machine monitoring system that is integrated into an industrial network. The templates allow the signal processing engines to be rapidly and centrally configured using the industrial network and for an alarm signal or the like to be provided directly to a standard industrial controller, for example, over the industrial network, for example, to safely stop machinery or to provide warnings, reports and the like.

The operating program may further identify at least one network address for an I/O module receiving process data related to the control of the machine and the combinatorial logic from the template may accept as arguments the process data.

Thus it is an object of at least one embodiment of the invention to enhance the ability to provide monitoring of a machine by accepting standard process data that may reflect the context of operation of the machine. This improved knowledge of the context or global operation of the machine, for example, can allow different vibration signatures to be used in different machine control modes and the like.

The sensor data may be vibration data and the configuration data, for example, may be vibration frequency range or amplitude range in absolute frequency or referenced to a fundamental frequency such as may be a rotation speed of a shaft or the like determined from a tachometer.

It is thus another object of at least one embodiment of the invention to manage high-speed vibration data and the like on a standard industrial network.

A user interface program may be provided prompting the user to provide the needed network addresses for the signal processing engines of the identified type.

It is thus another object of at least one embodiment of the invention to provide an appliance that may be readily installed and commissioned by those familiar with standard machine condition monitoring or possible control systems.

The machine condition assessment module may further include multiple templates associated with different machines and the operating program may operate to identify one template for use.

It is thus another object of at least one embodiment of the invention to provide for a cost-effective solution that balances the trade offs between being application-specific and having multiple uses to reduce platform cost.

The templates, for example, can be identified to a particular machine, such as a turbine device, a motor device, a gearbox device, a pump, fan coupling or a bearing device.

It is thus another object of at least one embodiment of the invention to provide a flexible system that may nevertheless be quickly commissioned to common monitoring applications.

Thus, it is an object of at least one embodiment of the invention to provide a system that may operate independently of the programmable logic controller, if one is present, on the same control network, thus providing for a degree of high reliability and simplified installation.

The memory of the machine condition assessment module may hold multiple data spaces assigned to different machines, each data space associated with different network addresses to allow concurrent execution of different instances of the combinatorial logic for different signal processing engines.

It is thus another object of at least one embodiment of the invention to allow a single machine condition assessment module to be leveraged among multiple machines further reducing costs. By allowing the system to work wholly within the constraints of the whole network a single machine control assessment module may be readily shared among machines that may be spatially separated.

These particular objects and advantages may apply to only some embodiments falling within the claims and thus do not define the scope of the invention.

DETAILED DESCRIPTION OF SPECIFIC EMBODIMENTS

Network Topology

Figure 1:
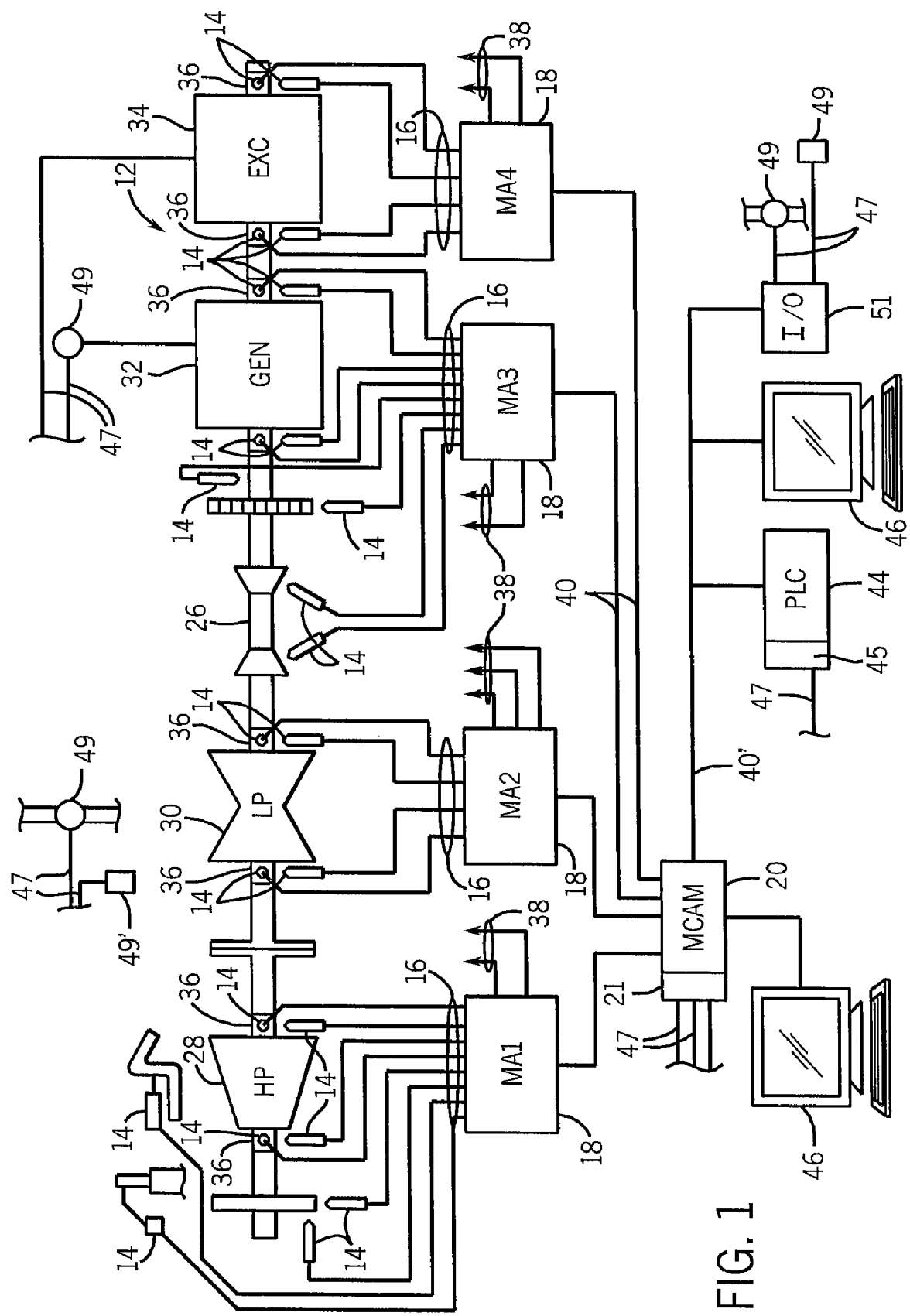
FIG. 1 is a diagrammatical overview of a machine system employing a machine condition assessment module communicating with a programmable logic control and with multiple signal processing engines to be fully integrated into a control system.

Referring to FIG. 1, a diagrammatical overview is illustrated of a monitoring system 10 applied to an exemplary machine system 12. The monitoring system 10 is particularly well-suited for detecting, monitoring, and controlling a wide range of dynamic operating parameters of machine systems. In particular, the system is well-suited to various types of rotary equipment, although other applications may be envisaged for certain aspects of the present technique. As used herein, the term "dynamic operating condition," or the reference to dynamic conditions in general, is intended to convey physical condition of a machine system, as opposed, for example, to process information related to the control of the machine system. The dynamic conditions may include such characteristics as vibration, rotation, speed, temperature, pressure, and so forth.

The monitoring system 10 is designed to permit selective monitoring of dynamic operating conditions at various points along a machine system. In general, these points will correspond to locations at which such parameters can be sensed, and may be separated and independent from one another. In the implementation illustrated in FIG. 1, for example, the machine system 12 generally represents a power generation system in which a wide range of dynamic operating conditions are monitored on a continual basis for informational and control purposes. Accordingly, the monitoring system 10 includes a series of sensors, detectors, or transducers 14 mounted near or on various points of the machine system to detect the desired dynamic operating conditions. Communication lines 16 extend from the various sensors and transducers to signal processing engines 18.

The signal processing engines 18 may be placed relatively close to the various monitored locations or points, and need not be grouped together. Certain of the signal processing engines 18, which will be described in greater detail below, may be linked to a machine condition assessment module or MCAM 20. The MCAM 20, or the signal processing engines 18 directly, may also be linked to an industrial controller such as a programmable logic controller or PLC 44. Typically, the signal processing engines 18 will be mounted closely adjacent to specific points or locations which are monitored, while MCAM 20 will be located centrally near the PLC 44.

In the exemplary machine system 12 illustrated in FIG. 1, rotary shaft 26 links a series of functional sections of the system, including a high pressure turbine section 28, a low pressure turbine section 30, a generator 32 and an exciter 34. As will be appreciated by those skilled in the art, the shaft and various components of the system are supported by a series of bearings 36. Other components may clearly be included in the system, although the representation of FIG. 1 has been intentionally simplified for explanatory purposes.

Throughout the present discussion it should be borne in mind that the turbine mechanical system of FIG. 1 is simply an example of one application. The present technique may be applied in a wide range of industrial settings, including to material handling applications, production equipment, assembly stations and lines, just to name a few. Moreover, the various components of the mechanical system need not be linked by single shaft, but may be disparate and linked only functionally in the overall system design. In the case of a turbine system, however, the various sensors, transducers, monitors, and other components of the system may form part of a turbine supervisory instrumentation system.

Signal Processing Engines

The various sensors and transducers 14 of the monitoring system 10 may produce a wide range of signals based upon the detected dynamic operating conditions. Each generates one or more raw operating condition signals which are applied to each signal processing engines 18 via the communication lines 16. The various transducers may be active or passive, and may receive power for operation via the communication lines. By way of example, the sensors and transducers of the instrumented turbine system of FIG. 1 may detect dynamic operating conditions such as valve position and case expansion, as indicated diagrammatically to the upper left in FIG. 1, eccentricity, bearing absolute casing vibration, both in X and Y directions, differential expansion, speed of rotation, rotational phase, and so forth. As will be noted by those skilled in the art, various sensors and transducers may be employed for these purposes, including linear variable differential transformers, non-contact pickups, rotary potentiometers, accelerometers, and so forth. Indeed, in a present implementation, the particular configuration of signal processing engines 18 includes a specially adapted vibration monitor designed to be coupled to a tachometer and to an accelerometer. Such accelerometers may detect, for example, signals indicative of shaft, casing, or pedestal vibration, depending upon the application.

The signal processing engines 18 serve generally to receive, process, report and act upon the signals supplied by the sensors and transducers to produce processed operating condition signals and, in some cases, to provide closed loop protection of the equipment monitored. Additionally specific elements within the signal processing engines 18 may process input signals to produce vibration data which is used by other systems such as the MCAM to analyze the performance of the mechanical system or to detect the presence mechanical or electrical faults in the monitored machinery. Where desired, and as described more fully below, specific processing of this type may be implemented by assessing multiple logically associated parameters that may be processed from one or more signal processing engines 18. As will be appreciated by those skilled in the art, certain of the monitored dynamic operating conditions may be particularly indicative of abnormal and unwanted conditions, such as wear, unbalance, excessive loading, and so forth.

In addition to processing within the signal processing engines 18, each signal processing engines 18 may generally provide outputs for external devices as indicated at reference numeral 38 in FIG. 1. The outputs may include electrical signals which can be applied to dedicated components, such as motors, alarms, lights, valves, and so forth. These outputs are generated based upon the monitoring and analysis functions performed by the signal processing engines and, depending upon the programming of the various modules, with input from remote devices such as the other monitoring assembly modules or a central or remote monitoring station.

As described more fully below, the signal processing engines 18 of the present technique make use of an open industrial data exchange protocol for the exchange of processed operating condition signals and other information both between signal processing engines within each monitoring assembly, and between the signal processing engines 18, and may use the same protocol for the exchange of data with remote devices such as MCAM 20. As used herein, the term "open industrial data exchange protocol" generally refers to a non-proprietary and non-fee based control network protocol for formatting and transmitting data traffic between independent control devices. A variety of such protocols have been developed and are presently available, including protocols designated generally in the industrial field as DeviceNet, ControlNet, Profibus, Ethernet/IP, and Modbus and OPC via Ethernet. Certain of such protocols may be administered by industry associations or bodies to ensure their open nature and to facilitate compliance with the protocol standards, such as the Open DeviceNet Vendors Association. It has been found that the use of a standard open industrial data exchange protocol for some or all of the communications between the modules, between assemblies, and between remote devices and the modules and assemblies, greatly enhances the interchangeability and applicability of the present system in various settings. Moreover, as described more fully below, the use of the open industrial data exchange protocol permits the individual signal processing engines to be easily interfaced in a completely modular and independent fashion without the use of a traditional backplane architecture.

Due to the use of the open industrial data exchange protocol, the signal processing engines 18 may be linked to one another via standard control network 40, illustrated between the signal processing engines 18 and the MCAM 20 in FIG. 1. Similar media may be routed both within each monitoring assembly, and between assemblies. While any suitable media may be employed for this purpose, for data exchange only, a two-conductor or shielded cabling system may be employed. Where, as in the present system, data and power may be provided at certain locations, a conventional network media such as a four-conductor cable may be applied for standard control network 40. In the present embodiment, the media may include both power and data conductors disposed in a flat insulating jacket designed to interface the conductors with devices by conventional termination and by insulation displacement connectors. Further a standard control network 42 may serve to link the signal processing engines 18 or MCAM 20 with remote monitoring equipment. It should be noted that the standard control network 40 and 42 may be identical where desired.

Those skilled in the art will recognize that the topology afforded by the present technique presents distinct advantages in terms of the physical media employed to connect the various components of the system. For example, conventional sensor or transducer wiring may be routed to the various signal processing engines 18, with internal wiring within the signal processing engines 18 being greatly simplified by the use of an open industrial data exchange protocol and by the interfacing of individual modules as described below. Moreover, due to the de-centralized or distributed nature of the signal processing engines and signal processing engines 18 in the topology, individual signal processing engines and assemblies may be placed local to specific points of interest in the machine system, with no need to route complex and bulky physical media to a central station or bank for interfacing with a conventional backplane-based monitoring assembly.

The various centralized or remote monitoring stations 22 and 24 may include any suitable equipment, such as general purpose or application-specific computers one or more PLCs 44 and interface terminals 46. Although simple computer systems are illustrated diagrammatically in FIG. 1, those skilled in the art will recognize that the centralized or remote monitoring stations may include highly complex analytical equipment, logging equipment, operator interface stations, control rooms, control centers, and so forth. As noted above, while at least one such monitoring station will typically be provided at or near the application, other stations may be provided entirely remote from the application, such as for monitoring plants, lines, production equipment, offshore facilities, and the like from entirely remote access points.

Referring still to FIG. 1, each of the signal processing engines 18 may communicate over a standard control network 40 with a MCAM 20 of the present invention. The MCAM 20 may, in turn, communicate either on the same standard control network 40 or a different standard control network 40' with a PLC 44.

As will be understood to those of ordinary skill in the art, the PLC 44 may have dedicated I/O modules 45 providing for I/O lines 47 communicating with various control actuators 49 (such as valves) or sensors 49' (such as temperature and pressure sensors) that provide control of the equipment, for example, in the case of a turbine steam temperature, pressure and flow rates and the like. Alternatively, the PLC 44 may communicate over the standard control network 40' with a spatially separate I/O rack or module 51, also having I/O lines 47.

In one embodiment of the present invention, the MCAM 20 may also have dedicated I/O circuitry 21 providing for its own I/O lines 47. The MCAM 20 may also communicate directly with an interface terminals 46, such as a personal computer, allowing it to be operated in a standalone mode. Similar interface terminals 46 may be attached to the standard control network 40 or 40' for control or monitoring of the PLC or the machine control assessment module as will be understood to those of ordinary skill in the art.

Figure 2:
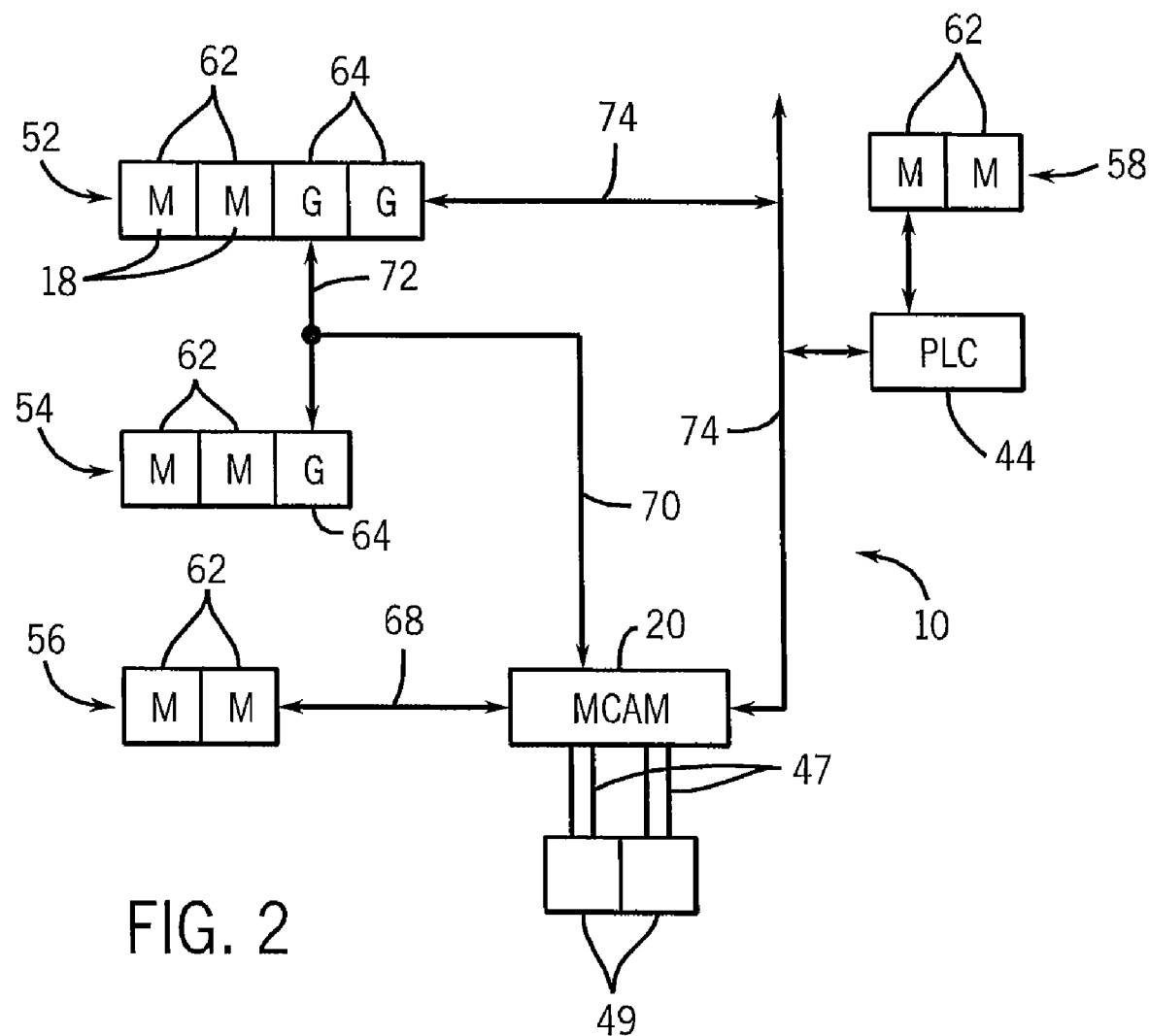
FIG. 2 is an exemplary topology for modules and related equipment for use in a machine system of the type shown in FIG. 1.

FIG. 2 illustrates an exemplary topology for a monitoring system 10 in accordance with aspects of the present technique. In the topology of FIG. 2, signal processing engines 18 are associated in groups 52, 54, 56, 58, and 60. Each group may contain as few as a single signal processing engines 18, and as many associated signal processing engines 18 as necessary at a desired point of interest of the machine system. Again, the individual signal processing engines 18, designated generally by reference numeral 62 in FIG. 2, are designed to communicate data between themselves in accordance with an open industrial data exchange protocol, and are individually mounted and interfaced without the use of a conventional communications backplane. The signal processing engine groups may further include one or more gateways 64 configured to receive or monitor signals from the signal processing engines 18 and to convey corresponding signals, in accordance with the same or a different data exchange protocol, to remote devices. For example, gateways 64 may afford data exchange in accordance with different open industrial data exchange protocols, enabling the use of multiple such protocols within the system, such as two or more of the protocols mentioned above. Other gateways may provide for easily interfacing external devices, including programmable logic controllers or digital control systems 66.

In the overall topology, then, certain of the signal processing engines 18 may be in direct communication with a PLC 44, as indicated by data lines 74 in FIG. 2. Other communications may be provided to the MCAM 20 as indicated at data lines 70, 68, and 74.

As noted above, in addition to facilitating the truly modular nature of the present system without reliance upon a conventional backplane architecture, the use of an open industrial data exchange protocol facilitates the exchange of data between monitoring groups or assemblies. Benefits of such topologies will readily appear to those skilled in the art. For example, the absence of a conventional backplane may effectively reduce the cost and size of the overall system, particularly where few signal processing engines are employed at specific locations of interest. Moreover, the overall system topology is inherently expandable and contractible to fit a particular application, with one or more signal processing engines being easily added to the system at designated locations of interest along the machine system. Moreover, as noted above, the use of network media for communicating signals between disparate and separated monitoring groups rather than a central rack-type monitoring station greatly reduces the cost and complexity of interconnections in the overall system, and specifically of wiring between the various sensors and a conventional central rack.

Figure 3:
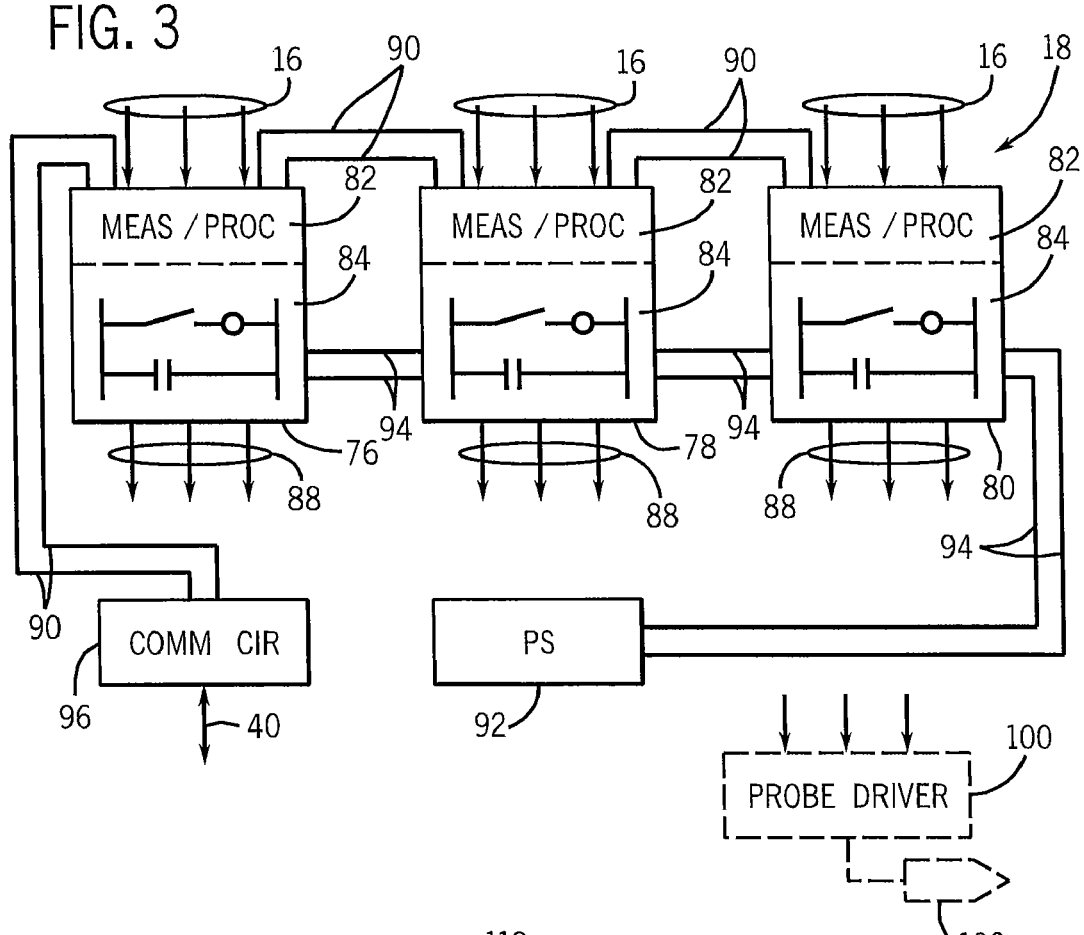
FIG. 3 is a diagrammatical representation of a series of associated modules in a group.

As mentioned above, in specific implementations, the signal processing engines 18 may perform desired measurement and processing functions, and may also serve to energize or de-energize components of the machine system. FIG. 3 illustrates diagrammatically internal elements of a signal processing engine 18 of the type illustrated in FIG. 1. In the illustrated example, the signal processing engine 18 includes a series of elements 76, 78, and 80. Each of the elements in the illustrated embodiment receives input signals at communication lines 16 and includes a corresponding signal processing circuitry 82, and a relay 84. The processing circuitry 82 includes circuitry for receiving, processing, and acting upon signals received from the various sensors and transducers. In a present implementation, for example, processing includes analysis of received signals for determination of vibration data, such as via a Fast Fourier Transform. As described more fully below, each element may include specialized processors adapted for these functions, as well as memory circuitry for storing configuration parameters in processing routines.

Based upon such processing, output signals may be produced and provided at output 88 in a manner described above, such as for controlling external relays, alarms, lights, LEDs, and other devices. At least certain of the elements in a present embodiment further include an integrated relay 84 which may produce output signals in a similar manner, such as for completing or interrupting a current carrying path through a load, such as a motor control device, starter, valve, indicator light, alarm, and so forth. It has been found that integration of a relay directly in signal processing engines 18 which can be much closer to the actual monitored points of interest, affords extremely rapid response times. In particular, it has been found that conformity with industry standards for protective devices, such as American Petroleum Institute (API) standard 670, can be met easily through the present monitoring system design and topology.

As mentioned above, to avoid the need for a conventional backplane, the signal processing engines 18 of the present system are designed to exchange data in accordance with an open industrial data exchange protocol. Indeed, this protocol is said to provide the "backbone" of the system, as opposed to the communication backplane of conventional systems. Accordingly, data links, represented generally by reference numeral 90 in FIG. 3 are provided between the signal processing engines. Various physical configurations for such links may be envisaged. Conventional wiring may be provided, such as through terminated wires or insulation displacement-type connectors. In a present embodiment, however, data links are provided between the modules by use of interconnecting terminal bases as described more fully below. Each individual module, then, is adapted for data exchange in accordance with the adopted protocol. The signal processing engines 18 may further include power supply 92, providing constant voltage DC power, typically in the order of 24 volts. Alternatively, the media providing network links to the individual signal processing engines 18 may provide for power needs as well, such as through a power and data cable. Power supply lines 94 are routed to the individual signal processing engines, such as through the interfaced terminal bases.

The signal processing engines 18 themselves may be specifically adapted for certain functions, including vibration monitoring, speed monitoring, temperature monitoring, pressure monitoring, and so forth. Other devices may then include relay modules comprising one or more individual relay circuits controlled by the monitors, and probe drivers 100 in FIG. 3. Such probe drivers will typically provide power to probes or sensors 102 which are linked to the individual monitors.

Figure 4:
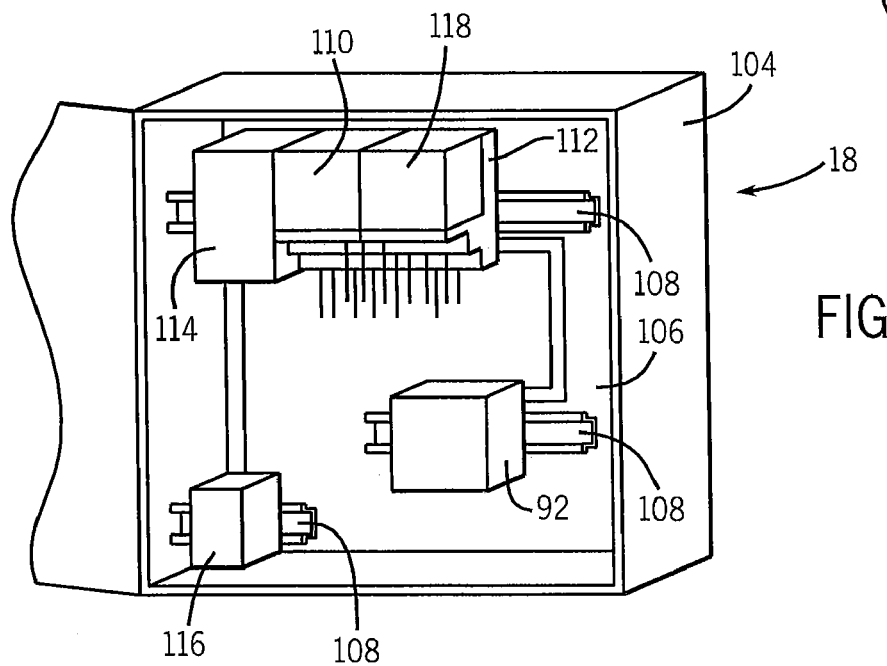
FIG. 4 is an exemplary physical configuration of modules within an enclosure, such as at a desired machine location.

As mentioned above, the present monitoring system design and topology facilitate the free association of independent and modular monitors at points of interest around a machine system to monitor and control dynamic operating conditions. FIG. 4 illustrates a typical installation for one such group or assembly of devices at a machine location. In a present embodiment, the various monitors and associated devices are adapted for mounting in an enclosure 104, such as a conventional NEMA enclosure. A panel 106 serves for mechanical mounting of the various devices, such as through the use of DIN rails 108.

In the embodiment illustrated in FIG. 4, the components of signal processing engine 18 include a monitoring element 110, such as a vibration monitor, one or more terminal bases 112, a gateway 114, a signal conditioning module 116 and a relay module 118. A power supply 92 is coupled to the relay module and to the signal processing engine and gateway via appropriate power conductors. Each module appropriately conditions and regulates power received from the power supply. The terminal base 112, which may include a plurality of terminal bases, such as individual bases for the signal processing engine and relay module, serves to receive terminated conductors for routing signals to and from the modules, such as to and from sensors, transducers, and controlled devices, such as relays, lights, alarms, and so forth. The assembly at each point of interest in the machine system may therefore be expanded or contracted by the addition of other monitoring, relay, or other modules both along a single line or group interconnected via terminal bases, or by subsequent groups interconnected with the modules at the location via conventional network media. The gateway and signal conditioning circuitry, then, serve to interconnect the various modules of an assembly or group with other modules of different assemblies or groups, or directly with a central or remote monitoring station or MCAM 20.

Figure 5:
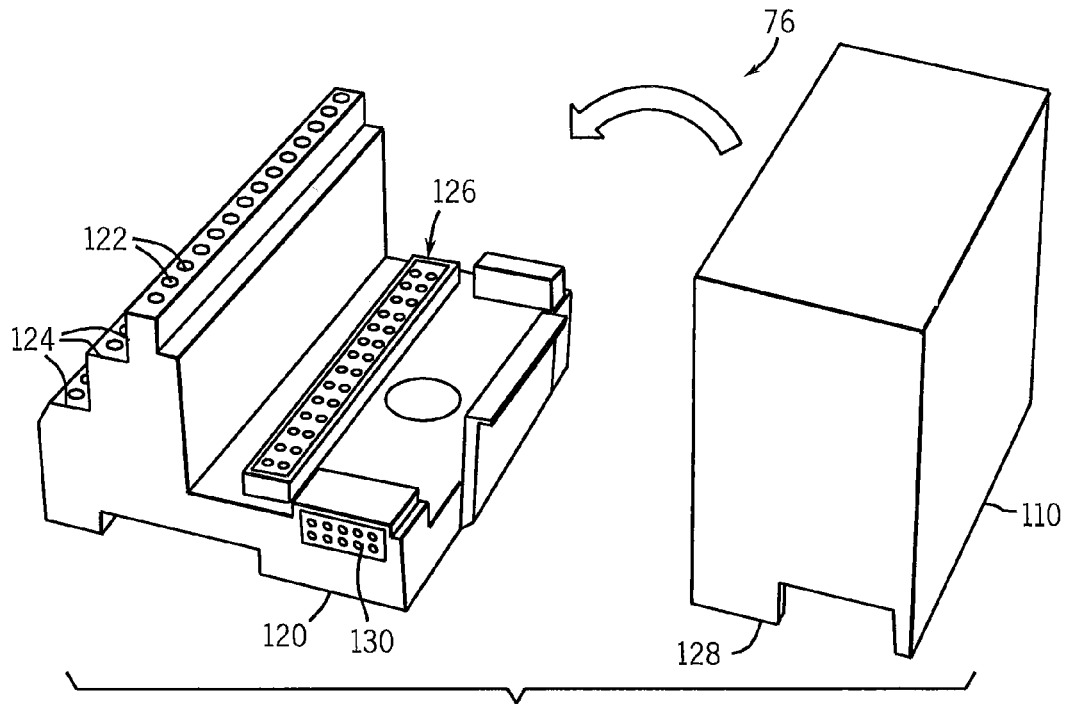
FIG. 5 is a perspective view of an exemplary module implementation for accepting a signal processing engine on a standard interface that communicates with similar interfaces and modules via the present technique.

FIG. 5 illustrates a simplified perspective view of an actual monitoring element 76 and its terminal base. In the illustration of FIG. 5, the terminal base 120 serves to mechanically mount the module on a support structure, such as a DIN rail. Terminals 122 are provided for terminating conductors, such as data and power conductors used to transmit signals to and from the signal processing engine. The terminals may be provided in tiers 124 to facilitate the use of a substantial number of terminations, fifty-two such terminations being provided for each terminal base in the present embodiment. An interface 126 is provided in the terminal base for receiving a monitoring element 110. The interface 126 includes connections for the various power and signal lines needed for the signal processing engine, with the signal processing engine including a similar electrical interface along a bottom side thereof. The signal processing engine interface 128 thus simply plugs into the terminal base for completion of all necessary connections. For interfacing the various monitoring, relay, and other modules of a group or assembly, then, a terminal base interface 130 is provided. In the illustrative example of FIG. 5, the interface 130 is extendable and retractable from the side surface of the terminal base, and, when extended, plugs into a conforming receptacle within an opposite side of a similar terminal base. Necessary connections for data exchange in accordance with the open industrial data exchange protocol are then provided between the interface modules via the respective terminal bases.

Figure 6:
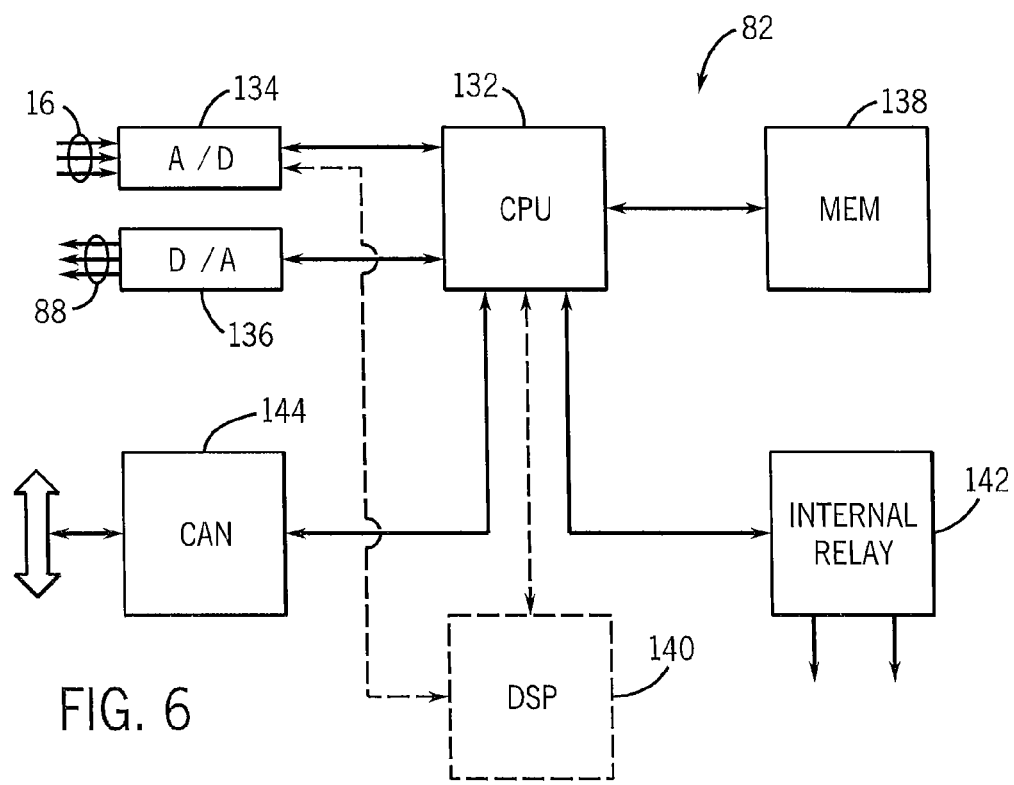
FIG. 6 is a diagrammatical representation of exemplary functional components of a module for performing and monitoring functions.

As noted above, the individual signal processing engines include a circuitry designed to permit them to receive signals from sensors and transducers, and to process the signals and act upon the signals in accordance with predetermined routines. FIG. 6 illustrates an exemplary configuration of functional circuitry within a signal processing engine in accordance with the present technique. As illustrated in FIG. 6, the signal processing engine processing circuitry 82 includes a CPU 132 designed to carry out data management functions, to coordinate the exchange of data, and to control certain processing functions. An analog-to-digital converter 134 receives input signals from communication lines 16, converts the input signals to digital signals, and applies these signals to the CPU 132 or DPS 140. In a present embodiment, a 24 bit, 96-ksample/second converter provides extremely high resolution for the calculations made within the signal processing engines, although other sampling rates may be employed. Similarly, a digital-to-analog converter 136 receives digital signals from the CPU 132 and provides output 88, such as for monitoring, analysis, or recording systems. A memory circuit 138 stores configuration parameters and codes, as well as routines implemented by the CPU 132. Such routines may include analysis of received signals, such as to determine vibration data, including vibration profiles as described more fully below. The routines may also include code for analyzing and comparing data to preset alarm limits or advisory limits. Moreover, the processing code stored within memory circuit 138 may permit comparison of various signals or value levels, flags, alarms and alerts, and similar parameters within a single monitor or with signals received from other monitors or remote monitoring and control equipment, such as to define voting logic for energization or de-energization of devices within the system.

It should be noted that a wide variety of configuration parameters may be stored within each signal processing engine. For example, sensor or transducer parameters may include the transducer type, its sensitivity, units of measure, low and high fault settings, DC bias time constants, and so forth. In vibration signal processing engines, parameter settings may include such settings as channel name (for each of the multiple channels provided), output data units, high pass filter settings, full scale settings, sampling mode settings (e.g. synchronous or asynchronous), and so forth. Overall measurement parameters may also be set, such as for RMS calculations, peak calculations, peak-to-peak calculations, overall time constant calculations, damping factor calculations, as well as a range of spectrum and time waveform parameters. The latter may include values such as maximum frequency, number of lines or bins in spectrum measurements, period of waveforms, number of samples in waveform measurements, and window type (e.g. Hanning, rectangular, Hamming, flat top, and Kaiser Bessel). Band measurement parameters may also be set, such as RMS and peak signal detection settings, minimum and maximum frequencies in bands, and so forth. Similarly, various settings may be provided for speed or tachometer settings, such as for averaging, pulses per revolution, trigger mode, and so forth.

In addition to the foregoing circuitry, certain of the monitors may include a dedicated digital signal processor 140 as illustrated in FIG. 6. In a present embodiment, for example, a dedicated digital signal processor is provided for carrying out certain analysis functions, and compliments the CPU 132 in the signal processing provided in the signal processing engine. In this present embodiment, vibration data is derived from signals received by the signal processing engine. The analog-to-digital converter 134 receives conditioned signals and applies these signals to the digital signal processor 140 either directly, as in a present embodiment, or indirectly such as via the CPU. Dedicated processing can be performed on the signals, such as by application of analysis routines which may include a Fast Fourier Transform to establish a vibration profile over a range of speeds or frequencies of interest.

In a present embodiment, the CPU 132 performs functions such as control of communications, including control of data traffic over a bus, serial communications, such as for configuration of the signal processing engine and memory circuitry, controls utilization of memory, and processes data from the digital signal processor 140. The CPU may also control such functions as powering up and powering down devices, and control of a relay circuit, or other internal or external device. It has been found that, where provided, the digital signal processor 140 in conjunction with the processing capabilities of the CPU 132 can greatly enhance the performance of the signal processing engine both in terms of the computations that can be performed, and the rapidity with which such computations can be performed. As will be appreciated by those skilled in the art, such gains in processing capabilities can greatly enhance the responsiveness of the module to rapid changes in dynamic operating conditions.

Other circuitry which may be provided within the signal processing engines includes an internal relay 142 illustrated diagrammatically in FIG. 6. While such circuitry may also be complimented by external circuitry, such as individual relay modules as discussed above, the provision of an internal relay circuit allows the signal processing engine to perform extremely rapid, locally closed-loop protective functions. Code stored within memory circuit 138 and executed by the CPU 132 may include local comparisons of processed data, such as vibration data, speed data, temperature data, pressure data, and so forth, to pre-set or operator-configurable limits or ranges. Where such a limit is reached, extremely rapid response may be provided by the integrated relay circuitry, the state of which can be quickly altered by the CPU 132.

The CPU 132 may also implement code which causes a change in the state of the relay circuitry in response to signals received from remote sources such as other modules and central processing circuits. Effectively then, the signal processing engines may implement protection or control loops at several levels. Firstly, at a local level, the CPU may alter the operating state of the relay circuit extremely rapidly due to detected changes in operating conditions and by comparison with desired levels or ranges. In a broader, more remote control loop, input signals may be processed and analyzed at least partially remotely, with commands for operation of the relay circuitry being transmitted from the remote location and simply implemented by the CPU or implemented by the CPU in conjunction with locally-produced analytical data.

Communications circuitry, such as control area network circuitry 144 is preferably included in each signal processing engine to permit the formatting, transmission, and reception of data in accordance with the desired protocols. As noted above, the present signal processing engines preferably communicate with other modules and with external circuitry via an open industrial data exchange protocol.

As mentioned above, a present implementation of the techniques and signal processing engine designs discussed herein accommodates analysis of vibration data. Such vibration data may be a key component in mechanical system monitoring, control, and protection. In a present implementation, vibration profiles are generated in dedicated vibration monitors based upon multiple channels of signal acquisition, from accelerometers and tachometers. The circuitry within the vibration monitors performs any suitable analysis to generate vibration data, which may be presented as a vibration profile. Alarm or alert ranges, limits, levels, and the like may be established and combined with the vibration data for monitoring, protection and control functions both within the signal processing engine and in conjunction with other signal processing engines and control devices.

Figure 7A:
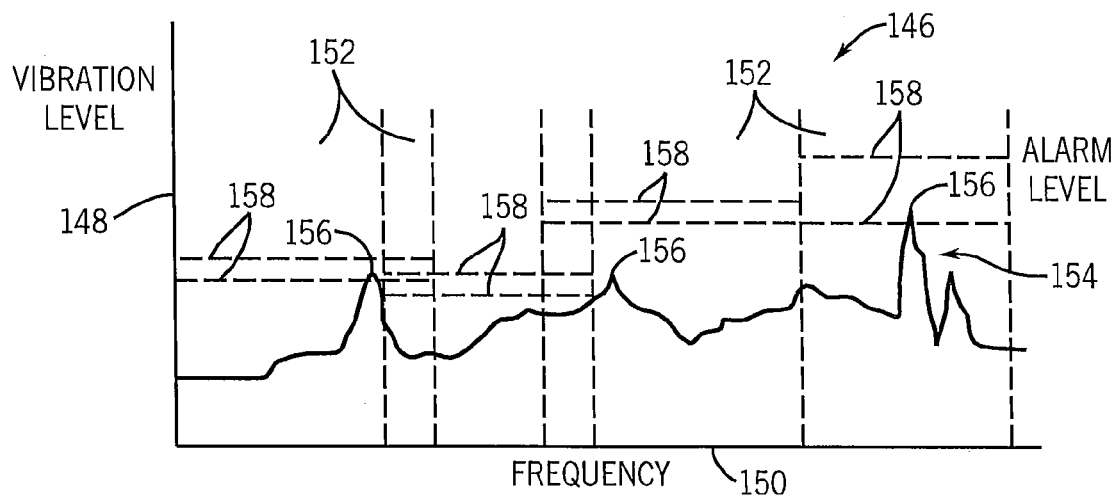
FIG. 7A is a graphical representation of dynamic parameter data, such as vibration data, indicating a manner in which various alarm settings may be implemented and utilized.

FIG. 7A represents an exemplary vibration profile as well as certain vibration bands and alarm levels which may be utilized in this way. In the graphical illustration of FIG. 7A, referred to generally by reference numeral 146, the magnitude of vibration, as indicated by axis 148 is displayed at various frequencies along axis 150. The frequencies may be divided into desired bands 152, such as by reference to actual operating frequencies of the equipment. That is, bands may be established for analysis purposes which are divided at any convenient point over a range of frequencies of interest (including overlapping or spaced apart bands). The actual vibration profile 154 extends across the bands 152 and will typically exhibit a range of magnitudes depending upon the nature and characteristics of the machine system. As will be appreciated by those skilled in the art, for example, a typical rotating machine system will exhibit certain natural frequencies which result in elevated magnitudes of vibration reaching peaks 156 in FIG. 7A.

Heretofore known devices for analyzing machine vibration typically provided an extremely limited ability to compare vibration data with limits defining unacceptable or undesirable conditions. In the present technique, a large number of alarm limits may be set by a user through configurable parameters stored within memory circuit 138 described above with reference to FIG. 6. FIG. 7A illustrates a number of such alarm limits indicated generally by reference numerals 158.

The alarm limits illustrated in FIG. 7A have several interesting and particularly useful characteristics. Firstly, different alarm levels may be set for different frequency bands, the limits of which may also be set, so as to allow for the specific tailoring of the monitoring and protection functions to individual systems based upon their typical or desired frequency response. Moreover, multiple alarm levels may be set by an operator for each frequency band and for the multiple frequency bands. Accordingly, the alarm levels may be configured so to define ranges such as minimum and maximum vibration levels. The configurations also permit the alarm levels to be used in various manners. By way of example, attaining certain alarm levels may result in reporting only, while attaining more elevated alarm levels may result in sounding or displaying an alarm, or in energization or de-energization of a relay circuit so as to start or stop a piece of machinery. The rapid analysis of vibration data in this manner, for example, may be used to start or stop electric motors, switch valves, illuminate lights, sound audible alarms, and so forth.

Figure 7B:
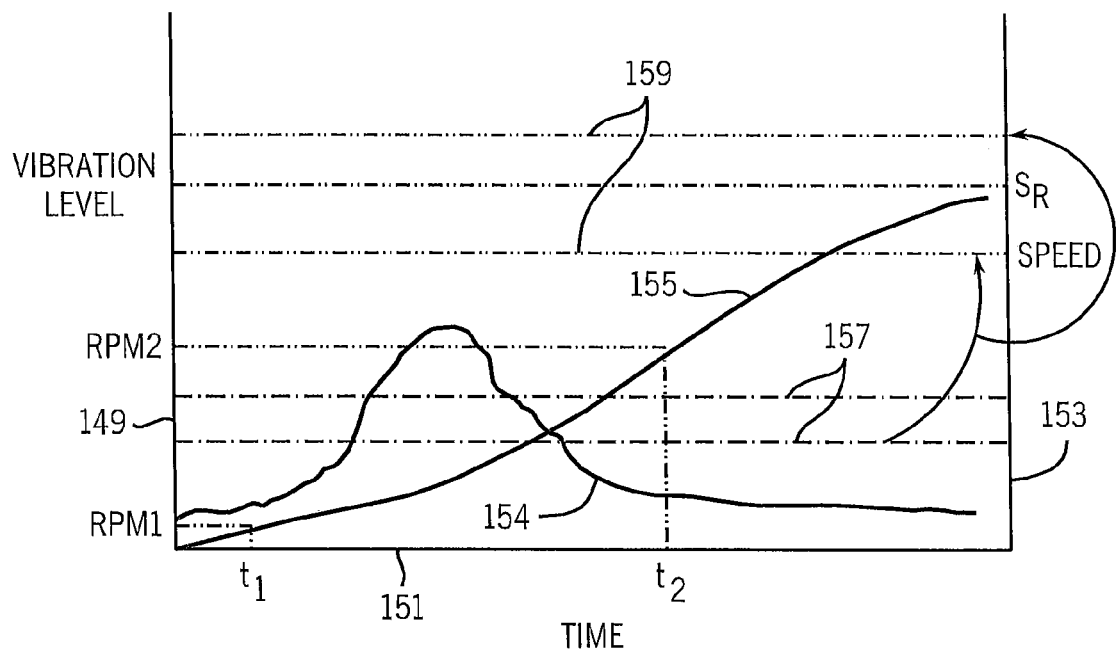
FIG. 7B is a graphical representation of a technique for multiplying or raising certain alarm settings, such as during startup or shutdown of monitored systems.

FIG. 7B illustrates an additional feature of the alarms and their utilization in the present technique. In particular, multipliers for one or all of the alarms may be utilized to avoid false alarms for other erroneous feedback during periods of operation, such as startup or shutdown. In the illustration of FIG. 7B, for example, along a time axis 151, a vibration trace, as indicated generally by vibration profile 154, varies with the magnitude of vibration, as indicated at axis 149. The actual operating speed of the system is also represented along vertical axis 153. Accordingly, in addition to the vibration profile 154, an operating speed trace 155 is illustrated. Within the time of the axis illustrated in FIG. 7B, therefore, the machine system, or a rotary portion of the machine system being monitored is brought up to speed. As will be appreciated by those skilled in the art, machine systems will typically exhibit one or more operating speeds at which vibration levels are significantly elevated. Thus, in the illustration of FIG. 7B, a large peak develops as the machine system is brought up to speed (or conversely, as it is shut down).

As mentioned above, a number of alarm levels can be configured in the vibration monitor implementation of the present technique. Two such alarm levels 157 are illustrated in FIG. 7B. The alarm multiplier of the present technique permits these levels to be increased during certain periods of operation, typically during startup and shutdown, so as to avoid false alarms. In the graphical illustration of FIG. 7B, during a period from $t_1$ to $t_2$ spanning a range of speeds from RPM1 to RPM2, the multiplier is implemented to raise the alarm levels to levels 159. Thus, the peak that occurs within this speed range will not trigger an alarm. Such multipliers may be implemented to avoid such false alarms, either on a speed basis or on a time basis with the steady state alarm levels configured in the monitors being returned following either the preset time or as the system rises above the speed. Other schemes of multiplier implementation may, of course, be envisaged. The use of multipliers, therefore, allows the present system to conform to industry standard specifications, such as API 670, paragraph 5.4.2.5 and Appendix I.

As already mentioned, a number of alarms and alerts may be configured in a present implementation of a vibration monitor incorporating aspects of the present technique. For example, in a current implementation, two channels are available in the vibration-signal processing engine, with 8 alarm settings being available per channel. The number and a name designation of each alarm may be set, along with parameters for enabling or disabling of each alarm. Conditions for response to the alarm settings may include "greater than," "less than," "inside range," "outside range," and various threshold settings for certain of these. Hysteresis settings may also be provided to prevent false alarms or to prevent clearing of an alarm. Similarly, threshold multipliers and startup periods may be set to prevent false alarms during periods of startup or transition of machinery through certain resonant frequencies.

Figure 8:
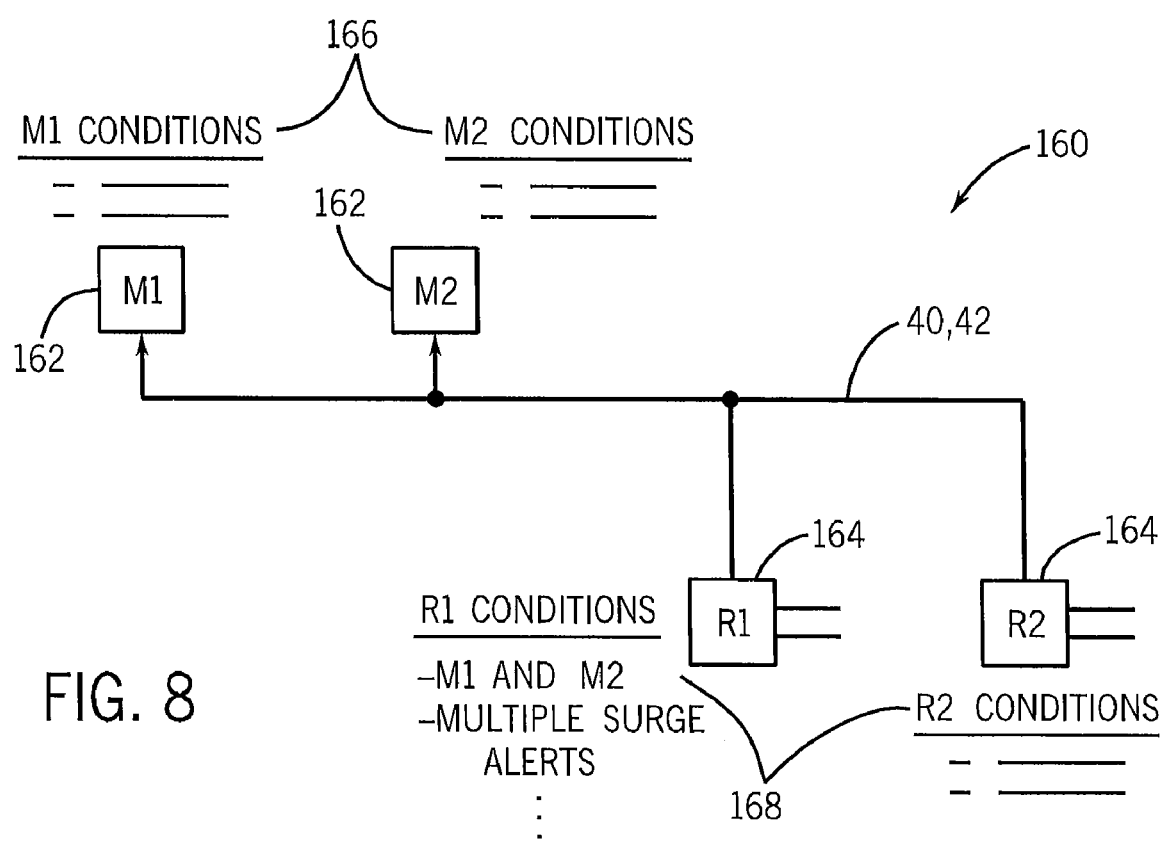
FIG. 8 is a diagrammatical representation of the interplay between program settings in a series of monitors and relay modules, such as for more complex voting logic schemes in accordance with aspects of the present technique.

As noted above, the code stored and executed within each signal processing engine may be combined with that of other modules or with remote control equipment to create a voting logic structure which is extremely flexible and configurable. FIG. 8 illustrates generally an exemplary topology or hierarchy which may be established by virtue of this modularity and configurability. The logic scheme 160 may be thus distributed among devices, such as monitors 162 and integrated or physically separate relay circuits 164. The monitors, relay circuits, and any other device standard control network 40 or 42 as described above. Configuration code within each signal processing engine may then be implemented including programmably by a user, to account for analyzed data produced by the individual module, as well as data or signals from other modules.

In a present implementation, certain conditions may be programmed within each module as indicated generally at reference numeral 166. These conditions may include, by way of example, actual parameter levels or values, conditions such as whether an alarm or alert limit has been exceeded, the particular state of a device, sensor, transducer, or other input, and so forth. These conditions alone may suffice for commanding the change of state of an integrated or external relay circuit. However, the conditions may also be combined with other conditions monitored by other modules so as to define combinatorial logic and a voting logic structure stored either within the individual modules or, as indicated in FIG. 8, within the relay circuits. In the example of FIG. 8, the relay logic 168 may combine signals from two or more signal processing engines, such as to require a specific signal from more than one signal processing engine, from one signal processing engine but not another signal processing engine, or multiple types of signals, such as surge alerts, before effecting a change of state. In general, such combinatorial logic may be based upon Boolean logic conditions which are programmed either within the signal processing engines or within the relay circuits. Owing to the high degree of modularity of the present system and its topology based upon the open industrial data exchange protocol, such voting logic is easily implemented and configurable both as a system is initially installed and as a system is altered (i.e. expanded or contracted).

By way of specific example, in a present implementation, each signal processing engine designed to allow for control of a relay may store various configuration parameters for identifying and controlling the device. These may include a name and number of the relay, an enable and disable selection, and a latching setting (i.e. whether the relay stays in the alarm state when the signal causing the alarm has ended). Other settings may include "failsafe" operation settings and activation delay settings. The voting logic settings within each signal processing engine may be based upon Boolean-type logic, such as "Alarm A or Alarm B," "Alarm A and Alarm B," or "Alarm A only." Based upon such conditions, multiple activation selections are possible to define the conditions that will cause the relay to activate, such as "normal," "alert," "danger," "disarm," "transducer fault," "module fault," and "tachometer fault."

As noted above, configuration code, including operating parameters, user-configurable parameters and values, alarm limits, alert limits, and the like, may be stored within each signal processing engine for processing, monitoring, protection and control functions. In a present embodiment, such code may be stored in other devices as well to permit reconfiguration of individual monitors, in the event the signal processing engines are damaged, repaired, replaced. A present technique permits automatic device replacement and reconfiguration by storing the pre-set parameters for individual modules in a master module, with the individual module taking the role of a slave. It should be understood that in the present context the designation of master and slave do not necessarily reflect the control functions executed by or control hierarchy established between the individual components. Rather, for the reconfiguration purposes, the designation indicates only that the master stores the configuration parameters and can restore the configuration parameters in a slave when necessary.

Figure 9:
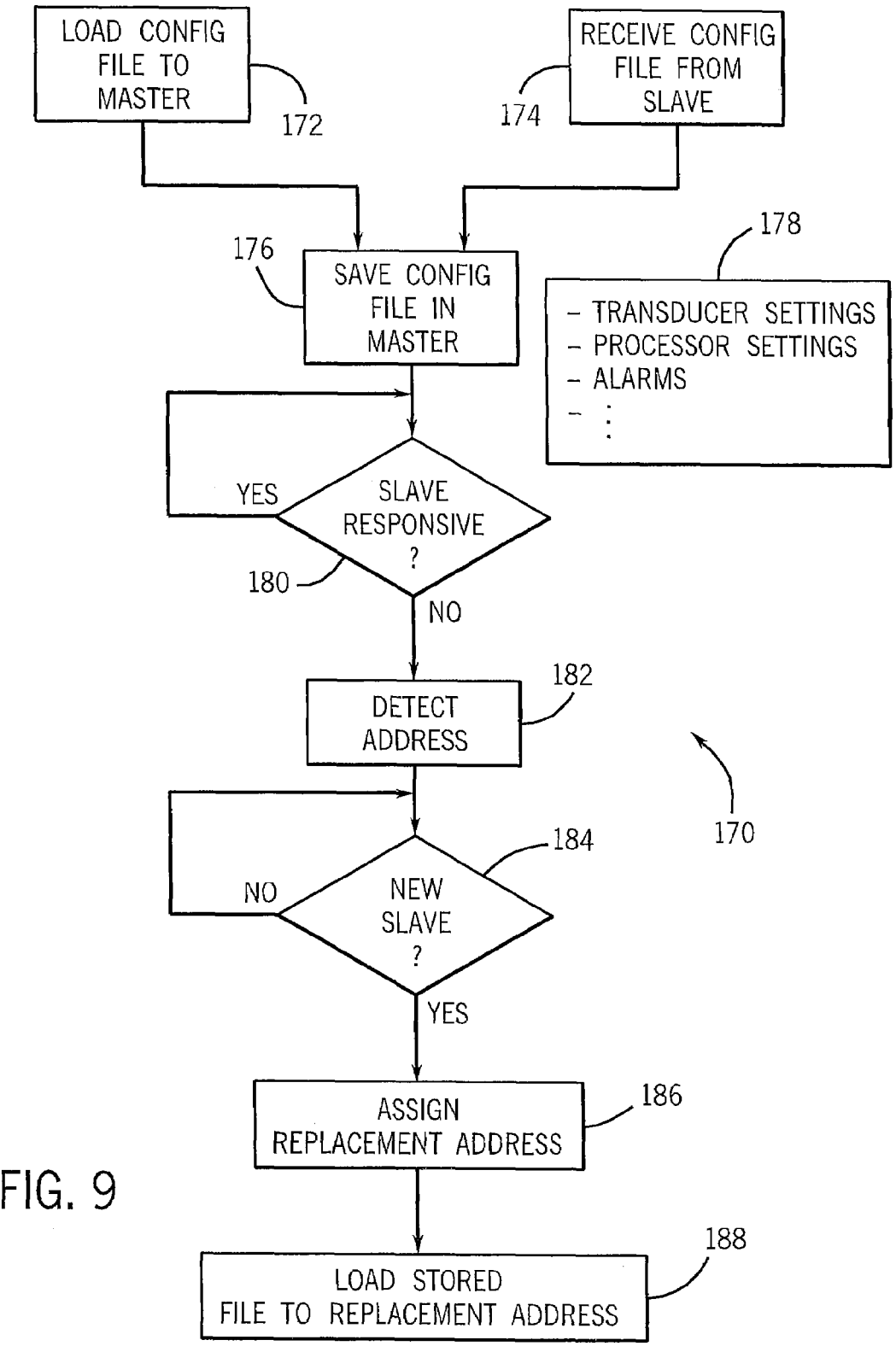
FIG. 9 is a flow chart illustrating an exemplary process for programming or reprogramming configuration settings within a module in accordance with aspects of the present technique.

FIG. 9 generally represents certain steps in logic for implementing such automatic device replacement and reconfiguration. The logic 170, begins after individual signal processing engines have been placed in service. The signal processing engines communicate among themselves in accordance with the open industrial data exchange protocol as described above. One of the modules, or another device, is designated as a master in a group, while other devices are designated as slaves. In a present embodiment, where a gateway is present in a monitoring group, the gateway will typically be employed as the master, with the signal processing engines themselves taking on the roles of slaves in the reconfiguration scheme. Certain signal processing engines may, where no such gateway is present, or where desired, take on the role of masters in this process.

In the summary of FIG. 9, the logic 170 begins at step 172 where a configuration file is loaded to a master, or at step 174 where the master receives the configuration file from a slave. In either case, the configuration parameters may include preset parameter values, as well as user-configurable values. Such user-configurable values may vary greatly depending upon the nature of the signal processing engine and the functions it is to carry out in the system. In general, however, once the configuration file has been transmitted to the master it is stored in the master's memory circuitry 176.

In present embodiments, the configuration parameters of the files may include specific parameters needed for the processing, protection, control, and reporting functions executed by the signal processing engine. By way of example, the configuration parameters may include transducer settings, processor settings, alarms, comparison limits, ranges, and so forth. The entire file, as indicated generally by reference numeral 178 in FIG. 9, is then stored both in the slave and in the master in a redundant fashion.

Once so configured, the system is allowed to operate in its normal fashion. During such operation, the master periodically either polls the slave or determines by some other means that the slave is operational and responsive. Many techniques exist in the art for such monitoring of operational state. Once a slave has been determined to be unresponsive, as indicated at decision block 180 of FIG. 9, its address is detected by the master at step 182. Within the overall system architecture, the various slaves and masters may be independently and specifically addressed in accordance with the open industrial data exchange protocol. The address detected at step 182 permits the master to correlate which device has become unresponsive with a specific configuration file stored in its memory. In the event the specific signal processing engine or slave is replaced, the slave will receive a new address, such as assigned by the master, which may be a specific address in a sequence of available addresses. When a new or replacement module comes online, then, the master will determine whether the new module is a new slave, at step 184, based upon the address reported by the slave.

In the event of replacement, resetting, repowering, or any other event which would cause the loss of configuration data in a slave, the master may replace the configuration file once the new slave has been detected at step 184 of FIG. 9. In a present embodiment, the replacement is performed by assigning a new or replacement address to the slave in place of a default address as indicated at step 186, and by loading the configuration file stored within the master into the replacement address as indicated at step 188.

In actual implementation, when a new or replacement module, or the same module following servicing, is replaced in the system, the replacement module comes online at the default address. The master module changes the address of the replacement module from the default address to the address of the missing slave, that is, to the address detected for the unresponsive (e.g. removed) module. The master module then downloads the configuration corresponding to this address into the replacement module. Alternatively, the replacement module may be preprogrammed with the address of the missing module. In such situations, when the replacement module comes online at the missing module address, the configuration parameters are similarly downloaded by the master module. Thus, all necessary configuration parameters, including specific alarm limits, voting logic functionality, and so forth, are restored to the signal processing engine of interest.

Machine Condition Assessment Module

Figure 10:
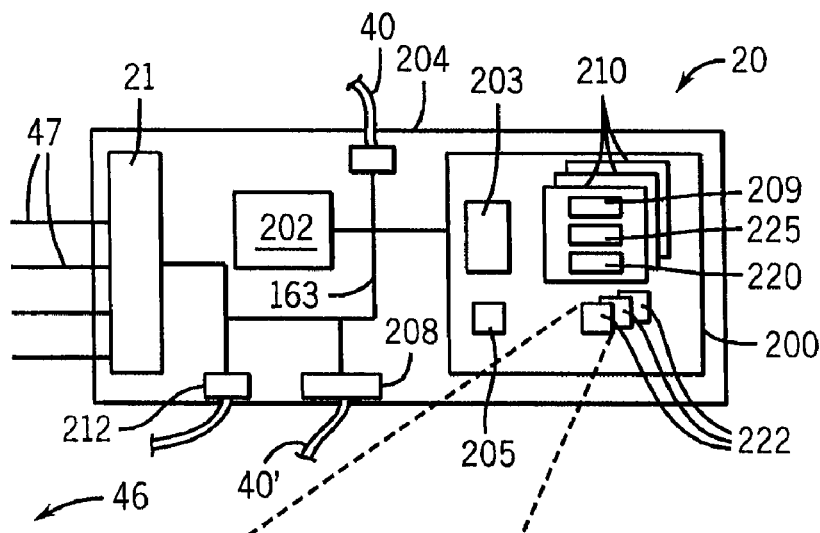
FIG. 10 is a block diagram of the machine condition assessment module of FIG. 1 showing an optional embodiment in which the machine control assessment module includes dedicated I/O circuitry and showing the memory, such as holds an operating program and multiple templates.

Referring now to FIG. 10, the MCAM 20 may include a processor 202 communicating on an internal bus 163 with a first network interface 204 communicating with the standard control network 40 and a second network interface 208 communicating with an alternative control network 40'. The bus 163 may also connect to a specialized terminal port 212 that may communicate with a dedicated interface terminals 46 (shown in FIG. 1) to allow the MCAM 20 to be configured when no network configuration access is available. The bus 163 also connects with I/O circuitry 121 in an optional embodiment.

The processor 202 communicates with memory 200, preferably including non-volatile memory, allowing the MCAM 20 to be preprogrammed at the factory or the like. The memory 200 may hold an operating program 203 and a user interface program 205 which alternatively may be part of the operating program 203.

The memory 200 importantly includes one or more templates 222 which provide all the necessary information and instruction to configure the MCAM 20 for providing monitoring to a particular machine. Referring still to FIG. 10, each template 222 will include template use information 228 describing the name of the template, the particular machine that the template 222 may monitor, the type of data required for this purpose and from where and how the data is to be accessed.

As referred to above, the template will also hold combinatorial logic 225 used to combine the dynamic condition data from the signal processing engines 18 or dynamic operating condition data or process data from a PLC to produce a desired output signal such as an alarm signal or the like.

For example: a simple fault logic might be defined in a template 222 to evaluate the condition of a machine's alignment. The template 222 holds combinatorial logic 225 such as IF (A>B and C>D) or (E>F) THEN ALIGNMENT-FAULT=TRUE Where A, C and E may be particular types of data, (for example, vibration data for particular bearings along a vertical axis at two times the running speed), and B, D and F are threshold values of vibration. The template 222 will specify the type of data (e.g., vertical axis vibration) and the preprocessing required of the data (band limited to the second harmonic of the running speed). It may also provide some guidance on how to process that value using a particular model of a commercially available measurement module such as the Rockwell XM series of measurement modules commercially available from Rockwell Automation of Milwaukee, Wis., but other preprocessing devices can also be used.

Generally, the combinatorial logic 225 may combine various dynamic condition data from the signal processing engines 18 together with I/O data from I/O modules 51 or from the PLC 44 or the MCAM 20's dedicated I/O circuitry to assess the health of the associated machine according to a variety of different algorithms well understood in the art. For example, knowing a particular pump is pumping a particular material, the combinatorial logic 225 may evaluate a high-frequency band of vibration against a particular threshold to detect cavitation or bearing failure or based on a different pumping material and different pumping regime to detect a different frequency band indicating bearing wear or eccentricity in a rotating shaft. The combinatorial logic may be pre-prepared by experts and provide for sufficient documentation to allow commissioning by other skilled personnel.

This information of the template 222 may be loaded into the MCAM 20 at the time of sale or may be downloaded to that particular MCAM 20 at a later time.

The operating program 203 may manage a set of data spaces 210 within memory 200 so that it can instantiate different instances of a monitoring process, each associated with different machines, and the same or possibly different templates 222, to be run concurrently according to techniques well known in the art. Generally, these data spaces 210 will hold instances of different configuration data 209, combinatorial logic 225, and address files 220, the later as will be described below.

Figure 11:
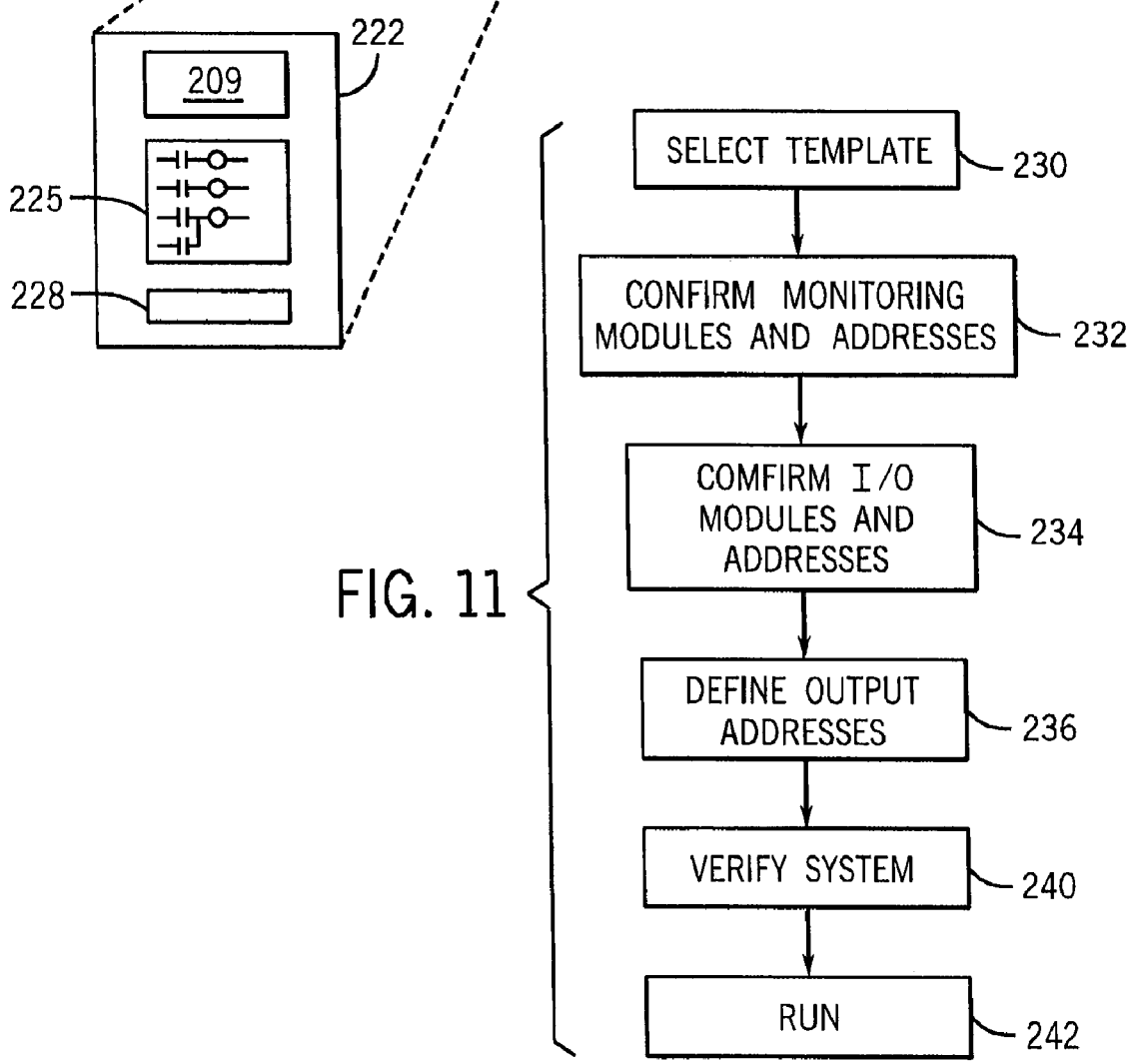
FIG. 11 is a flow chart showing the steps of the operating program of FIG. 10 in commissioning the machine condition assessment module of FIG. 10.

Referring now to FIG. 11, the operating program 203 works in conjunction with a user interface program 205 in the MCAM 20 or preferably in an attached terminal 46 that provides a menu driven interface or the like to a user on an interface terminals 46 to enable the MCAM 20 to be commissioned. At a first process block 230 of the program 203, the user is prompted to select a template based on the template use information 228 of each template in the MCAM 20, in the situations where multiple templates are available. A template 222, for example, may be identified by the template use information 228, that may describe a particular machine component, such as rotating shafts, bearings, gears, or entire machines such as turbines, pumps, fans and the like.

At process block 232, the selected template 222 is reviewed by viewing the combinatorial logic 225 and the template use information 228 to determined the necessary inputs to the combinatorial logic 225 which may have descriptive tags to indicate, for example, a particular signal processing engine 18 by description and/or part number necessary to provide an input to the MCAM 20. The signal processing engine, may for example, be an XM series module commercially available from Rockwell Automation or may be a specialized circuit card for fitting into a backplane or the like or set of components that are custom assembled to provide similar functionality of receiving raw dynamic operating condition data (for example vibration) and preprocessing that data to extract lower-date rate possessed dynamic operating condition data (for example vibration strength in a given band) as has been described above. The template my optionally provide connection and other information to the user to help the user identify and configure the necessary signal processing engines.

The user is prompted to ensure that each of these necessary devices is installed on the standard control network 40 or 40'. The user is then prompted to give an identifying network address for each required signal processing engine 18, this being understood to be the necessary information to allow the combinatorial logic to obtain data from the signal processing engine 18.

For example, for the above combinatorial logic of a template 222, the user may be prompted to enter the network type, the access method and data parameter and type as shown below:

A:
NETWORK Ethernet/IP
ACCESS METHOD: Input Table, Bytes 17-20
DATA TYPE: Float
B:
NETWORK DeviceNet
ACCESS METHOD: Explicit Message, Device Address 4
DATA PARAMETER: Channel_1_Band_1

C:
NETWORK DeviceNet
ACCESS METHOD: Poll Assembly, Bytes 11-14
D:
NETWORK Ethernet
ACCESS METHOD: OPC At process block 234, a similar process is undertaken to provide the combinatorial logic 225 with the necessary information from standard I/O modules 51, 45 or 21 as may be needed for the monitoring. Such data may, for example, be high-level data indicating the particular process being undertaken. For example, if the MCAM 20 is being used to monitor a pump, this data may provide for pump speed or for broad contextual information, such as the material being pumped, which may affect, for example, a particular signature profile that will be applied against the pump motor and bearings to determine if it is operating in acceptable limits.

At process block 236, a network address is provided for the outputting of possible alarm or other warning conditions. This network address may, for example, allow the PLC 44 to take the data from the MCAM 20 and use it in its control program, for example, to stop a process, to move to a safety state or to provide notice or warning to an operator or alert maintenance personnel to schedule the requisite repair.

These addresses which are stored in an address file 220 described above, which allows the combinatorial logic 225 to obtain the necessary data for its operation and to provide an output to an appropriate location, all fully integrated in the industrial control, monitoring and/or information systems. In this latter case, no industrial controller or PLC 44 is required.

At succeeding process block 240, the configuration data is downloaded to the particular signal processing engines 18 at the same time that their locations and identities are confirmed and verified over the standard control network 40. When this downloading and verification is complete, the MCAM 20 may enter a run mode indicated by process block 242.

This process of FIG. 11 may be repeated for multiple machines to be monitored, each of which may use the same or different templates with different instances of the combinatorial logic 225 and configuration data 209 and addresses files 220 being created for concurrent execution by a single MCAM 20.

It is specifically intended that the present invention not be limited to the embodiments and illustrations contained herein, but include modified forms of those embodiments including portions of the embodiments and combinations of elements of different embodiments as come within the scope of the following claims.

We claim:

1. A machine condition assessment system comprising:
   (a) a standard industrial communications network;
   (b) a plurality of signal processing engines on the network, the signal processing engine coupled to a sensor to receive at least one raw dynamic operating condition signal and to produce at least one processed dynamic operating condition signals representative of a dynamic operating condition of a monitored machine;
   (c) a machine condition assessment module having a processor; at least one network interface connecting the processor to the standard industrial communications network; and a memory communicating with the processor and holding a stored operating program; and a stored template program; the operating program executing on the processor to:
      (i) identify at least one type, location, and access method for dynamic operating condition data from the plurality of processing engines required to evaluate a specific condition for which the template is designed;
      (ii) identify at least one network address for an output signal indicating an alarm condition;
      (iii) execute combinatorial logic from the template accepting as arguments the dynamic operating condition data and producing as a value the output signal transmitted on the network;
      whereby the condition of the machine is monitored.

2. The machine condition assessment system of claim 1 wherein the output of the machine condition assessment module provides for each machines monitored, and for each of the alarm conditions assessed, a single parameter that indicates the presence and severity of the alarm condition selected from a group consisting of misalignment, imbalance, and eccentric air gap.

3. The machine condition assessment system of claim 1 wherein the operating program further executes to:
   identify at least one network addresses for at least one I/O module receiving a process signal related to the control of the machine;
   wherein the combinatorial logic from the template further accepts as arguments the process signal.

4. The machine condition assessment system of claim 1 wherein the raw dynamic operating condition signal is vibration data.

5. The machine condition assessment system of claim 3 wherein the template specifies the type, location and access method for vibration amplitudes at prescribed frequencies or multiples of running speed.

6. The machine condition assessment system of claim 1 further including a user interface program prompting a user to provide needed network addresses for the signal processing engines of the identified type.

7. The machine condition assessment system of claim 6 further including multiple templates associated with different machines and wherein the user interface further executes to identify at least one template for use.

8. The machine condition assessment system of claim 1 wherein each template is identified to a particular machine type.

9. The machine condition assessment system of claim 3 wherein the machine type is selected from a group consisting of a turbine device, motor device, gearbox device, pump, fan, coupling, a bearing device.

10. The machine condition assessment system of claim 1 further including input I/O circuits communicating with the processor and receiving a process signal related to the operation of the machine;
    wherein the combinatorial logic from the template further accepts as arguments the process signal.

11. The machine condition assessment system of claim 1 wherein:
    the industrial network is selected from an open standard network from a group consisting of DeviceNet, ControlNet Ethernet/IP and OPC, via Ethernet.

12. The machine condition assessment system of claim 1 wherein the memory further holds multiple data spaces assigned to different machines; each data space associated with different network addresses to allow concurrent execution of different instances of the combinatorial logic for different signal processing engines for concurrent monitoring of multiple machines.

13. A monitoring system for a machine, the monitoring system comprising:
    a programmable logic controller including at least one I/O module for the control of a machine;

a plurality of sensors disposed at a location with respect to the machine to sense a dynamic operating parameter of the machine during operation;

a plurality of signal processing engines coupled to the sensors to receive at least one raw dynamic operating condition data and process the dynamic operating data to determine at least one processed dynamic operating conditions of a monitored machine;

a machine condition assessment module communicating with the signal processing engines and the programmable logic controller over at least one standard industrial network, the machine condition assessment unit executing a stored program to execute combinatorial logic accepting as arguments the dynamic operating conditions and producing as an alarm value communicated over the standard industrial control network to the programmable logic controller.

14. The monitoring system of claim 13 wherein the combinatorial logic further accepts as arguments process data from the programmable logic controller.

15. The monitoring system of claim 13 wherein the raw dynamic operating condition data is vibration data.

16. The monitoring system of claim 13 wherein the monitoring system further includes a user interface program prompting a user to provide needed network addresses for the signal processing engines and the programmable logic controller.

17. The monitoring system of claim 13 wherein:

control network is selected from a group consisting of DeviceNet, ControlNet Ethernet/IP and OPC, via Ethernet.

18. The monitoring system of claim 13 wherein the machine condition assessment module holds multiple data spaces assigned to different machines; each data space associated with different network addresses to allow concurrent execution of different instances of the combinatorial logic for different signal processing engines for concurrent monitoring of multiple machines.

* * * * *